H. A. HARVEY.
Lock-Nut.

No. 224,591. Patented Feb. 17, 1880.

Witnesses:
Edw.d Payson
Geo. W. Miatt

Inventor:
H. A. Harvey
Per Edw. E. Lumby
Atty.

UNITED STATES PATENT OFFICE.

HAYWARD A. HARVEY, OF ORANGE, NEW JERSEY.

LOCK-NUT.

SPECIFICATION forming part of Letters Patent No. 224,591, dated February 17, 1880.

Application filed July 24, 1879.

*To all whom it may concern:*

Be it known that I, HAYWARD A. HARVEY, of Orange, New Jersey, have invented certain Improvements in Lock-Nuts, of which the following is a specification.

My improvements relate to that class of lock-nuts in which the locking of the nut upon the bolt is effected by the modification in the shape of the threads, either of the bolt or of the nut, or of both, which is caused by the act of applying the nut.

Patents have heretofore been granted to me for two kinds of lock-nuts of this class, one in which the threads were upset by the jamming of the nut against the object through which the bolt was inserted, and the other in which the threads were cut of variable pitch, for the purpose of bringing about an interference of the threads when the nut was set up home into its final position.

My present invention, in which the threads are of uniform pitch, consists of a nut having a portion of its thread of the same shape as the bolt-thread, so that the nut may be easily started upon the bolt, while the remainder of the nut-thread is thicker at the edge than the bolt-thread, but has a groove which is enlarged either by deepening or widening at the bottom, so that when the nut is forced upon the bolt the metal composing the base of the bolt-thread is compressed between the thicker edges of the nut-threads and is upset and is driven either radially outward or laterally into the enlarged part of the nut-thread groove. Thereby two results follow: first, the excessive friction of the upset threads tends to hold the nut firmly in its place; and, secondly, any tendency of the nut to unscrew itself is effectually resisted by the upset portion of the bolt-thread, which is unfitted for reception in that portion of the nut-thread which is shaped like the original shape of the bolt-thread.

It will doubtless be seen that this principle of construction may be carried out in various forms.

Preferably, I construct my lock-nuts for use in connection with bolts having the ordinary V-threads, and that portion of my nut which is first applied to the bolt is therefore provided with a V-thread corresponding to the shape of the V-thread of the bolt. In the remaining portion of the nut the thread is flat on the edge, and is made deeper than the V-thread, the angle of this part of the thread being more acute than the angle of the V-thread.

Figure 1:
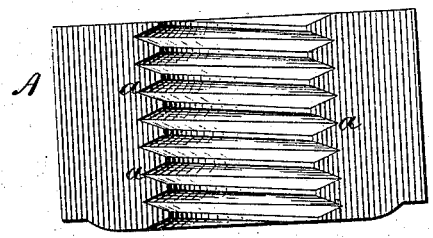
Figure 2:
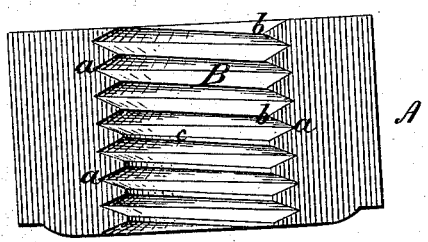
Figure 3:
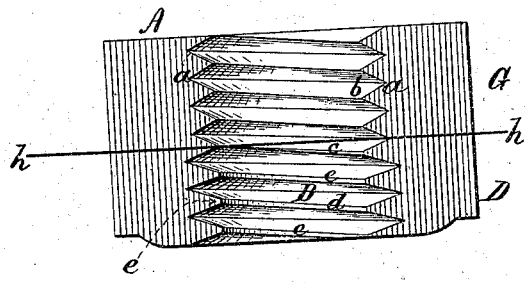
Figure 5:
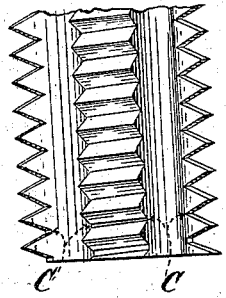
Figure 6:
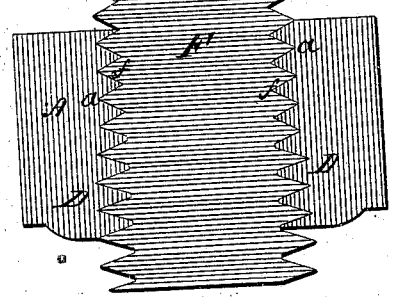
Figure 4:
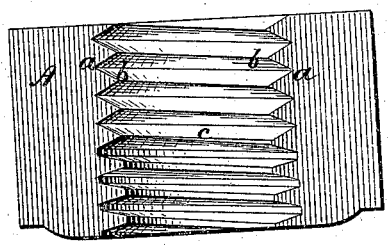

The accompanying drawings, illustrating my invention in various stages of construction, are as follows:

Figure 1 is a central longitudinal section of a nut, showing the form of the thread produced by the preliminary operation in the manufacture of my lock-nut. Fig. 2 is a similar section, showing the nut at its second stage of construction, in which a portion of the original thread has, by a second operation, been gradually converted into an ordinary V-thread without any alteration of the original pitch. Fig. 3 is a similar section, illustrating the final step in the operation of making the nut, in which it will be seen that the threads in what is intended to be the outer portion of the nut, while retaining their flat edges, are cut to greater depth, their angles being more acute than those of the V-threads. Fig. 4 is a similar section, substantially like Fig. 3, excepting that the angles of the flat-edged threads are still more acute, and the groove, instead of being made deeper, is widened at the bottom. Fig. 5 is an elevation of the tap for performing the second operation on the nut. Fig. 6 is a central longitudinal section of a bolt having my lock-nut applied to it, and exhibiting, upon a scale exaggerated for clearness of illustration, the modification in the shape of the bolt-thread produced by the action upon it of the thicker and deeper portion of the nut-thread.

On reference to the drawings it will be seen that, notwithstanding the various operations to which the nut A is subjected, the pitch of the thread is not altered.

In the first stage of manufacture, as shown in Fig. 1, the threads are all cut to a point, *a*, at the bottom, and are flat on the edge, resembling truncated threads.

In Fig. 2, which illustrates the result produced by the second operation, the bottoms *a* of the threads have not been altered; but in a portion, B, of the nut the angles of the threads have been changed by the cutting away of the excess of metal on either side, and the result is, that the outer edge, *b*, of the thread is sharp; or, in other words, this portion of the thread has been converted into a V-thread by a gradual cutting away of the sides of the truncated thread produced by the first operation. This operation I perform by means of a V-tap having its groove at the end gradually increased in width at the bottom, as shown at C in Fig. 5. Thus that portion of the original thread adjoining the place where the V-thread ends is converted into the spiral wedge c.

In Fig. 3, which represents the third and final stage in the manufacture, in the part D of the nut the flat faces d of the threads remain as they were formed in the first tapping operation; but these threads have been cut deeper by the action of a tool having a more acute angle, which has deepened the threads without increasing the width of the space e between the threads at the top.

In Fig. 6 the nut is represented as applied to a bolt, F, having originally a V-thread, f, which it will be seen retains its shape excepting at the places over which the portion D of the nut has been forced, in which places the bolt-thread is diminished in width at the base and expanded radially.

The action of the nut-thread in thus modifying the shape of the bolt-thread is greatly facilitated by the spiral wedge c, by means of which the upsetting of the metal composing the base of the bolt-thread is effected gradually and progressively.

As has already been stated, the nut-thread, instead of being deepened to receive the upset portion of the metal composing the bolt-thread, may be widened at the bottom, the essential feature of my invention being that by the action of a certain portion of the nut-thread there is a displacement of the metal composing the bolt-thread, and the bottom of the nut-thread groove is enlarged for the purpose of affording space to contain the metal which is thus displaced, the result being such an alteration in the shape of the bolt-thread that it ceases to fit that part of the nut which is provided with a V-thread.

The same result would ensue if two nuts were employed, one having a thread like the part G above the line h in Fig. 3, and the other having a thread like the part D below the line G in Fig. 3. The one nut, having a thread conforming to the shape of the bolt-thread, could be easily screwed on the bolt, but would be incapable of removal therefrom after the application of the other nut, except by the use of force sufficient to crowd back the metal composing the bolt-thread substantially into its original shape.

For the purposes of the present case, Fig. 3 may be taken to represent my invention as embodied either in a single nut having a thread of uniform pitch, but variable in the shape of its cross-section, as shown, or it may be taken to represent two nuts, the line h being the division-line between the two nuts.

I claim as my invention—

1. A screw-bolt having a thread of uniform pitch, in combination with a nut having a thread of like uniform pitch, a portion of the nut-thread being of the same area and shape in cross-section as the bolt-thread, the remaining portion of the nut having a thread varying from the shape of the bolt-thread by being thicker at its outer edge, and having the grooves between the successive convolutions of each thread deepened or widened at the bottom, for the purpose of affording space for the occupancy of the displaced metal of the bolt-thread, substantially as described.

2. A screw-bolt having a thread with sides inclined to a prescribed angle, in combination with a nut having a thread with sides inclined to a different angle, and having its grooves deepened or widened at the bottom, the pitch of the bolt-thread and the nut-thread being the same, substantially as and for the purpose set forth.

3. A nut for a screw-bolt provided with a thread, one or more convolutions of which at one end of the nut conform to the shape of the bolt-thread, and one or more convolutions at the opposite end of the nut vary in the shape of their cross-section from the shape of the bolt-thread in cross-section by being thicker at their outer edges and having grooves deeper or wider at the bottom, the nut-thread being uniform in pitch throughout, substantially as and for the purpose set forth.

4. A nut for a screw-bolt having a continuous thread of uniform pitch, of which thread one section, beginning at one end, is sharp-edged, another section, beginning at the other end, is flat-topped or truncated, and another section, intermediate and connecting the two sections first named, forms the spiral wedge c by the immerging of the flat-topped or truncated thread into the sharp-edged thread, the grooves between the successive convolutions of the truncated thread being deepened or widened at the bottom to accommodate material of the bolt-thread that may be displaced by the act of forcing the nut upon the bolt, substantially as set forth.

H. A. HARVEY.

Witnesses:
M. L. ADAMS,
GEO. W. MIATT.